No. 2,761.
T. BANKS
CAR WHEEL.
PATENTED AUG. 25, 1842.
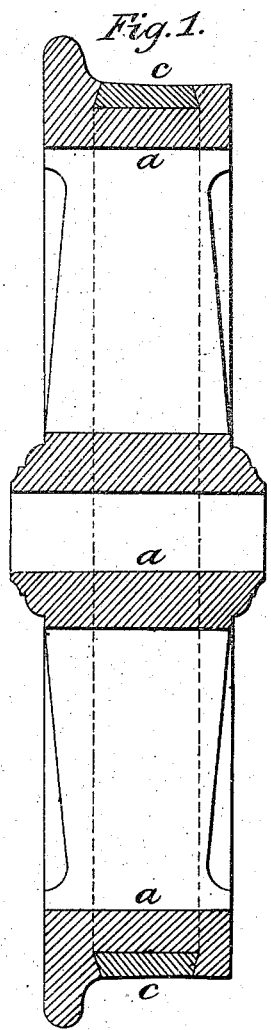
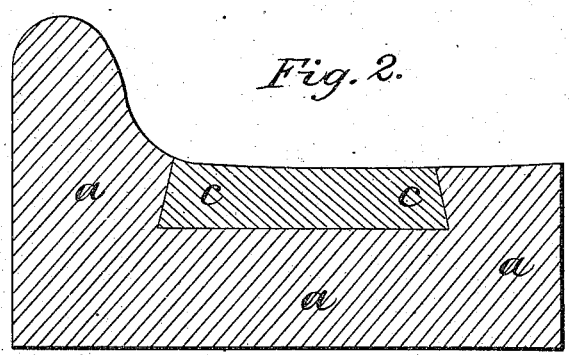
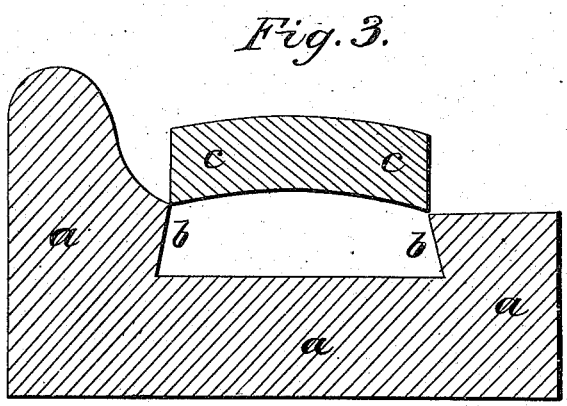
Witnesses.
John Davis.
Sangleaves.
Inventor:
Thos. Banks.

UNITED STATES PATENT OFFICE.

THOMAS BANKS, OF MANCHESTER, ENGLAND.

CAR-WHEEL.

Specification of Letters Patent No. 2,761, dated August 25, 1842.

*To all whom it may concern:*

Be it known that I, THOMAS BANKS, of Manchester, in the county of Lancaster and Kingdom of England, civil engineer, have invented or discovered a new and useful Invention of Certain Improvements in the Construction of Wheels and Tires of Wheels to be Employed on Railways; and I do hereby declare that the following is a full and exact description thereof.

This improvement in the construction of wheels and tires of wheels consists in placing, inserting or applying a bar or bars of steel in a groove formed in the periphery of railway wheels or tires of wheels, such groove being suitably turned or otherwise formed to receive the steel bar or bars.

In the drawing attached the improvement in railway wheels and tires of wheels is plainly exhibited.

Figure 1, represents a section taken transversely through a common railway wheel about one-fourth the real scale, *a a a* representing the rim or periphery, arms, and nave. The present improvement consists simply in turning the dove tailed groove *b b* out of the solid rim or periphery (whether the wheel be of wrought or cast iron or other material) and placing or inserting therein a bar or bars of steel *c* either in an entire piece throughout the circumference of the wheel or if preferred in smaller portions or segments placed together in the groove around the periphery of the wheel. Fig. 2 represents in section the tire of a wheel detached and of the full size and Fig. 3 a similar view excepting that in the latter the steel bar *c* is represented as about to be placed in the groove *b b* which is shown as it is cut or formed in the tire. Thus it will be seen that by the simple insertion or application of a bar or bars segments of steel either in the solid periphery of the wheel or in the tire where wheels are used with tires the durability of the wheel is greatly increased and as the steel bars are merely to be hammered while in a heated state into the groove and not welded to or with the wheel or tire they may when worn be replaced with new steel and thus the old body of the wheel be continually employed.

I claim therefore as an improvement in the construction of wheels or tires for wheels to be employed upon railways—

Placing, inserting or applying a bar or bars of steel in a groove turned or formed in the said wheels or tires, the steel part not being welded to or with the wheel or tire but capable of being easily removed when worn and replaced by new steel.

I would remark in conclusion that a modification of this invention may be made by substituting iron bars for steel in the tires of those wheels when the expense of the steel is not desirable.

THOS. BANKS.

Witnesses:
   JOHN DAVIES,
   SAML. PEARCE.